(12) United States Patent
Koseki

(10) Patent No.: US 12,186,762 B2
(45) Date of Patent: Jan. 7, 2025

(54) FLUID SPRAY NOZZLE MOUNTING

(71) Applicant: DENSO TEN Limited, Kobe (JP)

(72) Inventor: Tomohisa Koseki, Kobe (JP)

(73) Assignee: DENSO TEN Limited, Kobe (JP)

( * ) Notice: Subject to any disclaimer, the term of this patent is extended or adjusted under 35 U.S.C. 154(b) by 389 days.

(21) Appl. No.: 17/692,271

(22) Filed: Mar. 11, 2022

(65) Prior Publication Data

US 2023/0109037 A1    Apr. 6, 2023

(30) Foreign Application Priority Data

Oct. 6, 2021   (JP) .................. 2021-164586

(51) Int. Cl.
  *B05B 1/04*   (2006.01)
  *B08B 3/02*   (2006.01)
  *B08B 5/02*   (2006.01)

(52) U.S. Cl.
  CPC ............ *B05B 1/044* (2013.01); *B08B 3/02* (2013.01); *B08B 5/02* (2013.01)

(58) Field of Classification Search
  CPC .... B60S 1/481; B60S 1/60; B60S 1/56; B60S 1/52; B60S 1/62; B60S 1/48; B08B 3/02; A47L 5/24; A47L 5/28; A47L 5/362; A47L 9/10; A47L 9/102
  See application file for complete search history.

(56) References Cited

U.S. PATENT DOCUMENTS

2018/0345917 A1* 12/2018 Yamamoto ............. B60R 11/04
2022/0032878 A1*  2/2022 Shawgo .................... B60S 1/48

FOREIGN PATENT DOCUMENTS

JP    2013-018404 A    1/2013

* cited by examiner

*Primary Examiner* — Eric J Rosen
*Assistant Examiner* — John C Merino
(74) *Attorney, Agent, or Firm* — Oliff PLC

(57) ABSTRACT

A fluid spray nozzle includes a first member that is configured to be fixed to a sensor or a mounted portion to which the sensor is mounted, and a second member that is fixed to the first member. The first member has a fluid inlet and a first fluid passage that is connected to the fluid inlet. The second member has a second fluid passage that is connected to the first fluid passage, and a spray port from which the fluid that has passed through the second fluid passage is sprayed onto a predetermined location of the sensor.

13 Claims, 9 Drawing Sheets

FLUID SPRAY NOZZLE MOUNTING

BACKGROUND OF THE INVENTION

Field of the Invention

The invention relates to a fluid spray nozzle for spraying a fluid.

Description of the Background Art

For example, a washer nozzle for an in-vehicle camera that is disclosed in Japanese Published Unexamined Patent Application No. 2013-18404 (Patent Document 1) includes a fixed-side member having an inlet and a flow passage for guiding a washing liquid introduced from the inlet. The washer nozzle for the in-vehicle camera includes a movable nozzle member including: a slide part having a communication passage leading to the flow passage, and provided to slide with respect to the fixed-side member while the passages communicate with each other; and a nozzle part that integrally operates with the slide part and has an ejection port for ejecting the washing liquid supplied through the communication passage.

Since the movable nozzle member and the nozzle part are integrally operable and the slid part is slidably assembled with respect to the fixed-side member, it is possible to adjust the direction of the election port of the nozzle part for ejecting the washing liquid to be directed toward an imaging surface of the in-vehicle camera. Accordingly, it is possible to apply the same washer nozzle and improve versatility by adjusting the position of the movable nozzle member to change an ejection direction of the washing liquid for various in-vehicle cameras having different positions of the imaging surface depending on the shape, size, or the like.

As disclosed in Patent Document 1, if the movable nozzle member is provided to slide with respect to the fixed-side member to be fixed to a garnish, etc. provided on a vehicle body, for example, there is a concern that the number of components of the washer nozzle is increased and costs and burden of assembly work are increased. Thus, the development of a nozzle having a structure different from that of Patent Document 1 is desired.

SUMMARY OF THE INVENTION

According to one aspect of the invention, a fluid spray nozzle includes a first member that is configured to be fixed to a sensor or a mounted portion to which the sensor is mounted, and a second member that is fixed to the first member. The first member has a fluid inlet and a first fluid passage that is connected to the fluid inlet. The second member has a second fluid passage that is connected to the first fluid passage, and a spray port from which the fluid that has passed through the second fluid passage is sprayed onto a predetermined location of the sensor.

It is an object of the invention to provide a fluid spray nozzle capable of reducing a manufacturing cost and improving versatility.

These and other objects, features, aspects and advantages of the invention will become more apparent from the following detailed description of the invention when taken in conjunction with the accompanying drawings.

DESCRIPTION OF THE EMBODIMENTS

Figure 1:
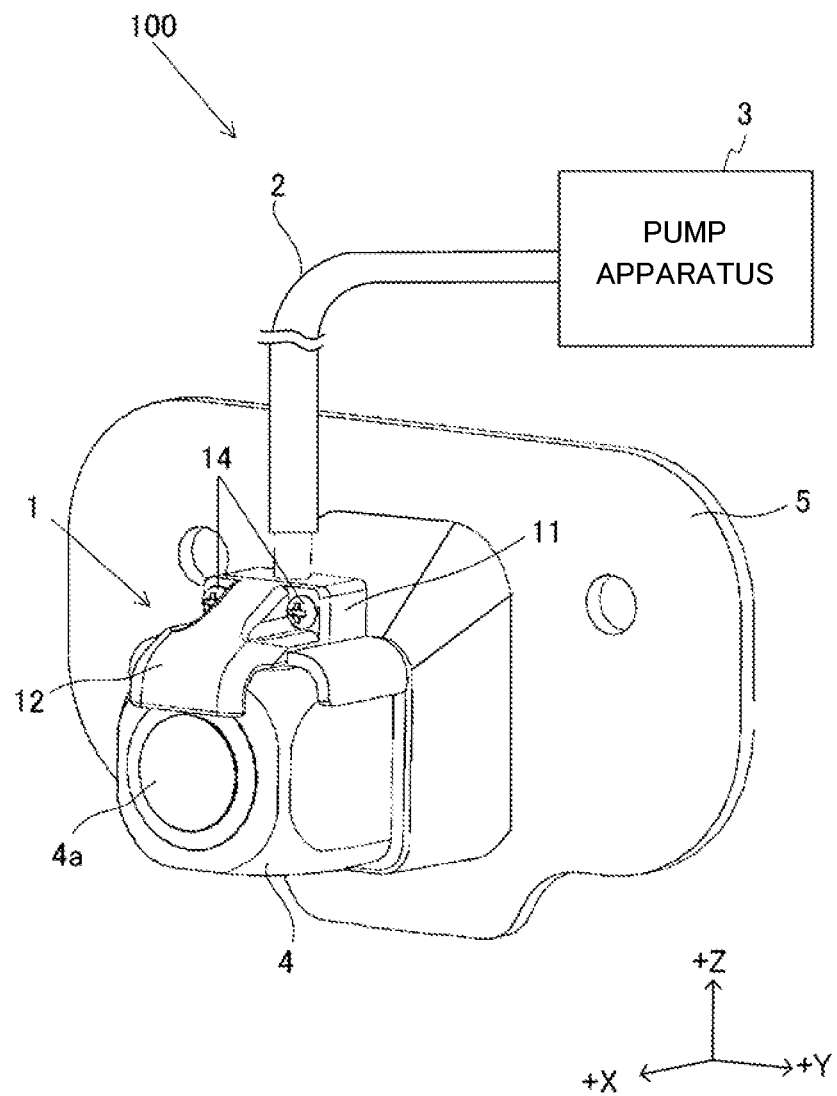
FIG. 1 illustrates a schematic configuration of a fluid spray system.

An exemplified embodiment of this invention will be described in detail with reference to the drawings. In the drawings, an XYZ orthogonal coordinate system is shown as a three-dimensional orthogonal coordinate system. In the following description, an X direction is referred to as a front-rear direction, a Y direction is referred to as a left-right direction, and a Z direction is an up-down direction. Furthermore, a positive X side is a front side and a negative X side is a rear side. A positive Y side is a right side and a negative Y side is a left side. A positive Z side is an upper side and a negative Z side is a lower side. However, these directions are simply used for explanation and do not limit an actual positional relationship and direction.

1. Fluid Spray System

A fluid spray system of this invention is an apparatus for removing a foreign matter adhering to a predetermined location of a sensor by spraying a fluid onto the predetermined location. The foreign matter is, for example, raindrops, mud, dust, or the like. The fluid is, for example, a gas, a liquid, or the like. The gas is, for example, air. The liquid is, for example, water, alcohol, or the like. A cleaning substance, such as a surfactant, may be contained in the liquid.

The sensor is, for example, a sensor mounted on a mobile body. The mobile body is, for example, a vehicle, an airplane, a ship, or the like. When the mobile body is the vehicle, the sensor is an in-vehicle sensor. Specifically, the sensor is, for example, a camera, a LiDAR (light detection and ranging), or the like. For example, when the sensor is the camera, the predetermined location is a lens. Furthermore, for example, when the sensor is the LiDAR, the predetermined location is a cover made of glass, etc. covering a light source that emits a light.

FIG. 1 illustrates a schematic configuration of a fluid spray system 100 according to the embodiment of this invention. The fluid spray system 100 of this embodiment is, for example, suitable for the mobile body, such as the vehicle. As illustrated in FIG. 1, the fluid spray system 100 includes a fluid spray nozzle 1, a fluid supply pipe 2, and a pump apparatus 3.

The pump apparatus 3 supplies a fluid to the fluid spray nozzle 1. In this embodiment, the pump apparatus 3 generates compressed air to supply the compressed air to the fluid spray nozzle 1. The pump apparatus 3 may be an apparatus that supplies a liquid to the fluid spray nozzle 1. In this case, the pump apparatus 3 is configured to supply the liquid from a tank that stores the liquid to the fluid spray nozzle 1.

The fluid supply pipe 2 is disposed between the fluid spray nozzle 1 and the pump apparatus 3. Specifically, one end of the fluid supply pipe 2 is connected to the fluid spray nozzle 1 and the other end is connected to the pump apparatus 3. The pump apparatus 3 supplies the fluid (air in this embodiment) to the fluid spray nozzle 1 via the fluid supply pipe 2. The fluid supply pipe 2 is a hose made of, for example, resin or rubber. However, the fluid supply pipe 2 may be a metal pipe.

The fluid spray nozzle 1 sprays the fluid onto the predetermined location of the sensor. In this embodiment, the sensor is a camera 4. The predetermined location of the sensor is a lens 4a of the camera 4. The fluid is air. That is, the fluid spray nozzle 1 sprays the air onto the lens 4a of the camera 4. By spraying the air from the fluid spray nozzle 1 onto the lens 4a, a foreign matter adhering to the lens 4a is removed. Hereinafter, details of the fluid spray nozzle 1 will be explained.

In this embodiment, as one example, the camera 4 is a camera that captures an image of a periphery of the vehicle. The camera 4 is disposed, for example, on an outside of the vehicle, such as a front, rear, left or right side of the vehicle. The camera 4 is disposed in the vehicle in a state in which the camera 4 is mounted to a camera bracket 5 to be fixed to an appropriate place of the vehicle.

2. Fluid Spray Nozzle 2-1. First Embodiment

Figure 2:
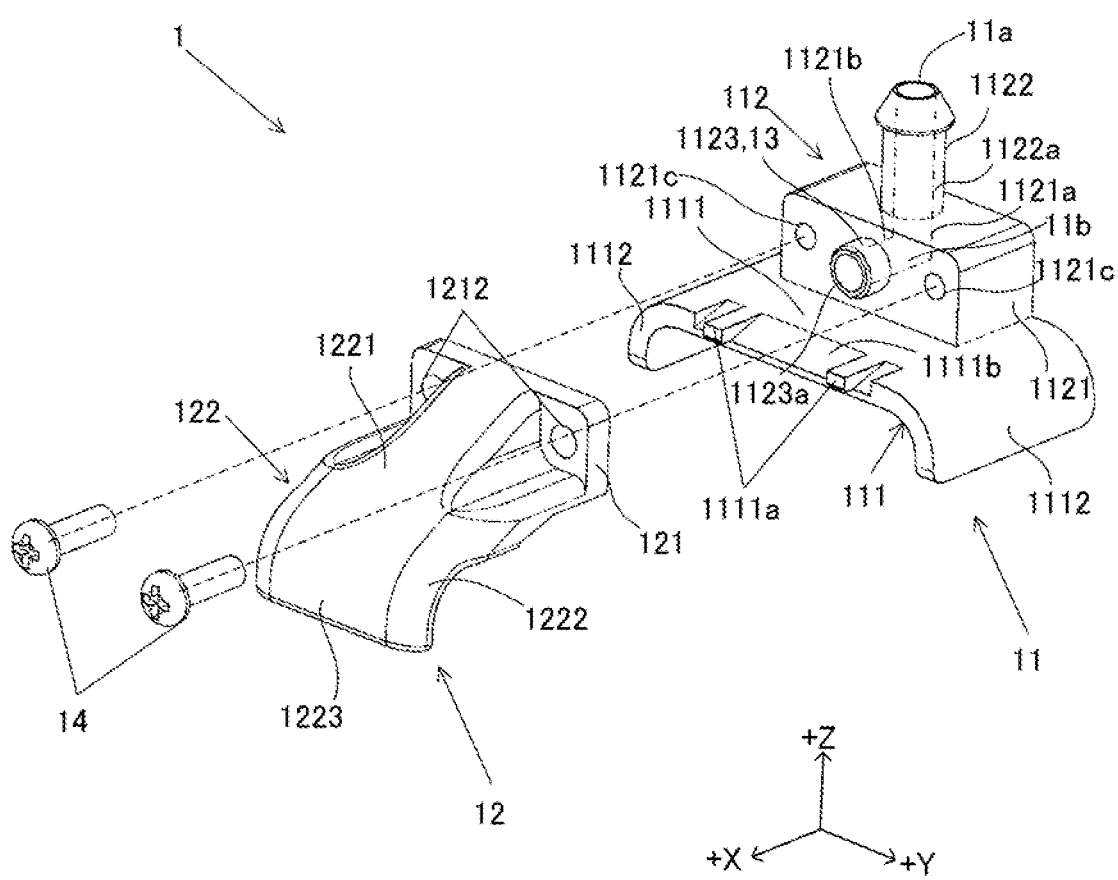
FIG. 2 is an exploded perspective view illustrating a schematic configuration of a fluid spray nozzle according to a first embodiment.

The fluid spray nozzle illustrated in FIG. 1 is the fluid spray nozzle 1 according to the first embodiment. FIG. 2 is an exploded perspective view illustrating a schematic configuration of the fluid spray nozzle 1 according to the first embodiment. As illustrated in FIG. 1 and FIG. 2, the fluid spray nozzle 1 includes a first member 11 and a second member 12. The first member 11 is a member separated from the second member 12. In this embodiment, the first member 11 and the second member 12 are made of resin, respectively. Materials of the first member 11 and the second member 12 are not limited to resin.

The first member 11 is fixed to the sensor or a mounted portion to which the sensor is mounted. In this embodiment, the first member 11 is fixed to the camera 4 as one example of the sensor. As illustrated in FIG. 2, specifically, the first member 11 has a camera mounting portion 111 to which the camera 4 is mounted and a first fluid passage constituting portion 112 in which a passage through which the fluid passes is provided. The camera mounting portion 111 and the first fluid passage constituting portion 112 are made of a single member.

The camera mounting portion 111 has a mounting flat plate portion 1111 and a pair of first member curved portions 1112. The mounting flat plate portion 1111 has a rectangular plate shape extending in a direction orthogonal to the up-down direction. Specifically, the mounting flat plate portion 1111 has a rectangular plate shape extending in the left-right direction in a plan view seen from the up-down direction. One of the pair of first member curved portions 1112 is connected to a right end of the mounting flat plate portion 1111 and the other is connected to a left end of the mounting flat plate portion 1111. Each of the pair of first member curved portions 1112 has a curved structure extending downward as moving outward in the left-right direction of the mounting flat plate portion 1111.

The mounting flat plate portion 1111 has a pair of projections 1111a projecting forward from a front end of the mounting flat plate portion 1111. The pair of projections 1111a are disposed at an interval from each other in the left-right direction. Specifically, in the plan view seen from the up-down direction, the pair of projections 1111a are disposed in line symmetry with respect to a bisector bisecting the mounting flat plate portion 1111 in the left-right direction. The mounting flat plate portion 1111 is provided with a slope 1111b at the front end thereof so that a thickness of the mounting flat plate portion 1111 decreases in the up-down direction as moving forward. The pair of projections 1111a extend forward from the slope 1111b.

An adhesive material is bonded to a lower surface of the mounting flat plate portion 1111 and the camera mounting portion 111 is fixed to the camera 4 using the adhesive material. The adhesive material is, for example, a double-sided tape. Specifically, the adhesive material is arranged between the lower surface of the mounting flat plate portion 1111 and an upper surface of the camera 4. The camera 4 is sandwiched by the pair of first member curved portions 1112 in the left-right direction in a state in which the camera mounting portion 111 is fixed to the camera 4.

That is, in this embodiment, the first member 11 has a sticking surface to be adhered to an outer surface of the camera 4 (one example of the sensor). In this embodiment, the sticking surface is the lower surface of the mounting flat plate portion 1111. In such a configuration, it is possible to directly fix the fluid spray nozzle 1 to the sensor. For example, when it is difficult to mount the fluid spray nozzle 1 to a member (e.g., the camera bracket 5) to which the sensor is mounted, the configuration according to this embodiment is convenient.

The first fluid passage constituting portion 112 has a rectangular parallelepiped portion 1121, a tubular portion 1122, and a projection 1123. The rectangular parallelepiped portion 1121 is disposed on an upper surface of the camera mounting portion 111. The rectangular parallelepiped portion 1121 extends in the left-right direction. In the plan view seen from the up-down direction, a center position of the rectangular parallelepiped portion 1121 is aligned with a center position of the mounting flat plate portion 1111 in the left-right direction. The rectangular parallelepiped portion 1121 is arranged close to a rear end of the mounting flat plate portion 1111. A width of the rectangular parallelepiped portion 1121 in a front-rear direction is smaller than a width of the mounting flat plate portion 1111 in the front-rear direction. Thus, the mounting flat plate portion 1111 has an upper surface that is exposed in front of the rectangular parallelepiped portion 1121.

The tubular portion 1122 extends upward from a central portion of an upper surface of the rectangular parallelepiped portion 1121. The tubular portion 1122 is specifically cylindrical. In an interior of the rectangular parallelepiped portion 1121, a first cavity 1121a that is connected to an internal space 1122a of the tubular portion 1122 and extends in the up-down direction is provided. Furthermore, in the interior of the rectangular parallelepiped portion 1121, a second cavity 1121b that extends rearward from the central portion of a front surface of the rectangular parallelepiped portion 1121 and is connected to the first cavity 1121*a* is provided. Each of the first cavity 1121*a* and the second cavity 1121*b* has a circular cross-sectional shape orthogonal to a flow direction of the fluid. A space in which the first cavity 1121*a* and the second cavity 1121*b* are connected to each other has an L shape when viewed from the left or right side.

The projection 1123 projects forward from the central portion of the front surface of the rectangular parallelepiped portion 1121. The projection 1123 that extends in the front-rear direction is tubular, and is specifically cylindrical. An internal space 1123*a* of the projection 1123 is connected to the second cavity 1121*b*. In the plan view seen from the front-rear direction, the internal space 1123*a* of the projection 1123 and the second cavity 1121*b* have circular cross-sectional shapes having a same center position and diameter.

One end of the fluid supply pipe 2 is connected to the tubular portion 1122. The fluid that has been supplied from the pump apparatus 3 to the fluid spray nozzle 1 via the fluid supply pipe 2 passes the internal space 1122*a* of the tubular portion 1122, the first cavity 1121*a*, the second cavity 1121*b*, and the internal space 1123*a* of the projection 1123, in this order, and exits from the first member 11.

That is, the first member 11 has a fluid inlet 11*a* and a first fluid passage 11*b* that is connected to the fluid inlet 11*a*. In this embodiment, the fluid inlet 11*a* is positioned at an upper end of the tubular portion 1122 and introduces air. The internal space 1122*a* of the tubular portion 1122, the first cavity 1121*a*, the second cavity 1121*b*, and the internal space 1123*a* of the projection 1123 constitute the first fluid passage 11*b* as an air passage.

Figure 3:
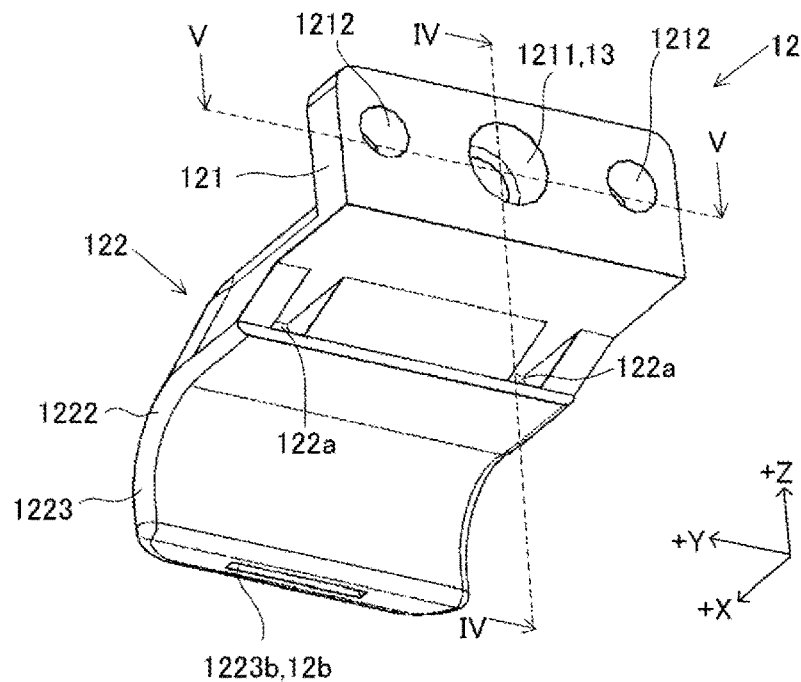
FIG. 3 is a schematic perspective view illustrating a configuration of a second member of the fluid spray nozzle according to the first embodiment.
Figure 4:
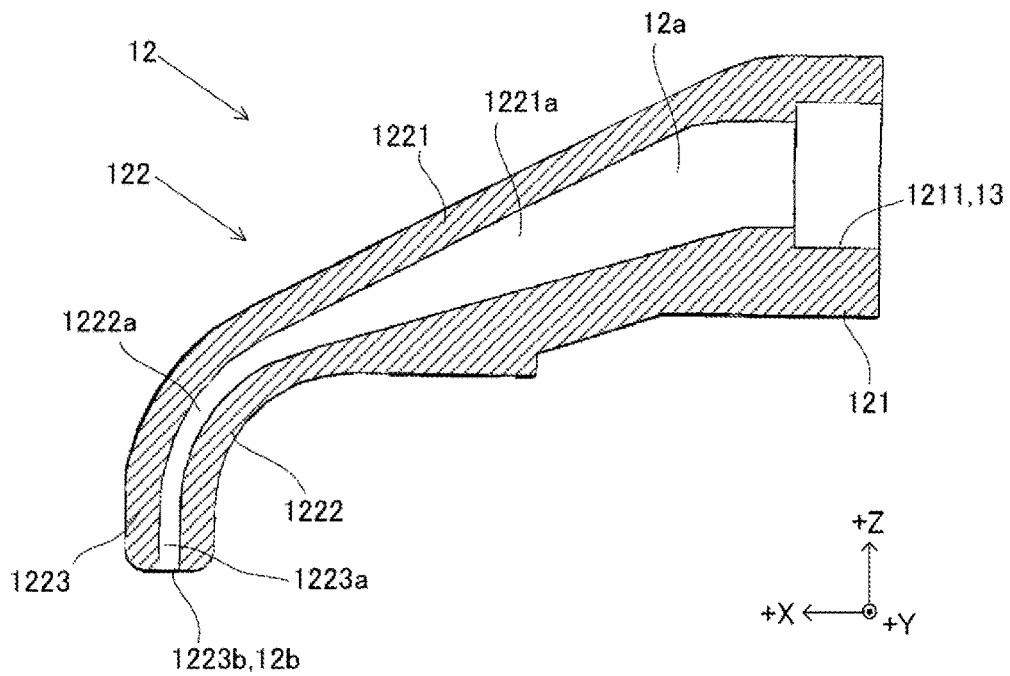
FIG. 4 is a schematic cross-sectional view taken along a line IV-IV of FIG. 3.
Figure 5:
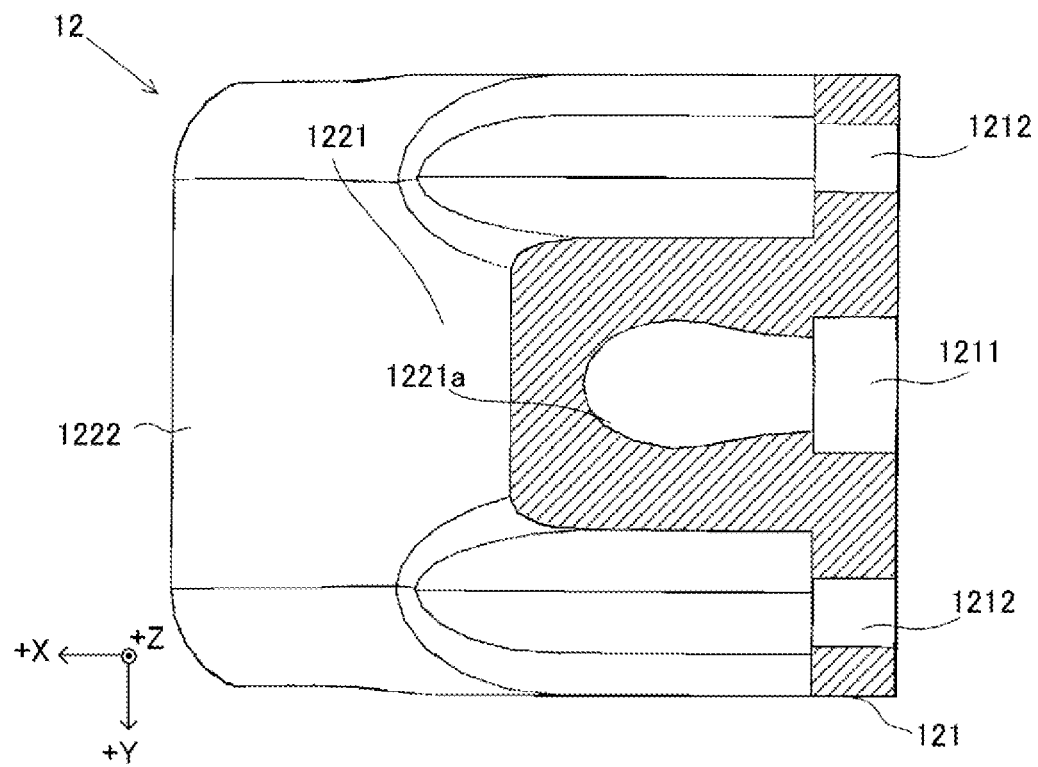
FIG. 5 is a schematic cross-sectional view taken along a line V-V of FIG. 3.

The second member 12 is fixed to the first member 11. Details of a method of fixing will be described later. FIG. 3 is a schematic perspective view illustrating a configuration of the second member 12 of the fluid spray nozzle 1 according to the first embodiment. FIG. 4 is a schematic cross-sectional view taken along a line IV-IV of FIG. 3. FIG. 5 is a schematic cross-sectional view taken along a line V-V of FIG. 3. As illustrated in FIG. 2 to FIG. 4, the second member 12 has a coupling portion 121 that is connected to the first member 11, and a second fluid passage constituting portion 122 in which a passage through which the fluid passes is provided. The coupling portion 121 and the second fluid passage constituting portion 122 are made of a single member.

The coupling portion 121 has a rectangular plate shape extending in a direction orthogonal to the front-rear direction. Specifically, the coupling portion 121 has a rectangular plate shape extending in the left-right direction in a plan view seen from the front-rear direction. The coupling portion 121 has an opening 1211 in a central portion of a rear surface. The opening 1211 extends rearward along the front-rear direction and is connected to a second fluid passage 12*a* (details will be described later) to be provided in the second fluid passage constituting portion 122.

The second fluid passage constituting portion 122 has a slope 1221, a second member curved portion 1222, and a second member end 1223. The slope 1221 is arranged in front of the coupling portion 121 and is connected to the coupling portion 121. The slope 1221 has a slope structure in which a height position of an upper surface of the slope 1221 becomes lower in the up-down direction as moving forward. In an interior of the slope 1221, a slope cavity 1221*a* that extends downward as moving forward is provided. A rear end of the slope cavity 1221*a* is connected to the opening 1211. The slope cavity 1221*a* has a structure in which a width in the up-down direction of the slope cavity 1221*a* becomes narrower as moving forward. The slope cavity 1221*a* has a structure in which a width in the left-right direction of the slope cavity 1221*a* becomes wider as moving forward.

The second member curved portion 1222 is arranged in front of the slope 1221 and is connected to the slope 1221. The second member curved portion 1222 has a curved structure that extends downward as moving forward. In an interior of the second member curved portion 1222, a curved cavity 1222*a* that extends downward as moving forward is provided. A rear end of the curved cavity 1222*a* is connected to the slope cavity 1221*a*. The curved cavity 1222*a* has a structure in which a width in the left-right direction of the curved cavity 1222*a* becomes wider as moving forward.

The second member end 1223 that is connected to a front end of the second member curved portion 1222 has a plate shape extending downward. In an interior of the second member end 1223, an end cavity 1223*a* that extends in the up-down direction is provided. An upper end of the end cavity 1223*a* is connected to the curved cavity 1222*a*. A lower end of the end cavity 1223*a* is connected to an external space via an end opening 1223*b* to be provided in a lower surface of the second member end 1223. The end cavity 1223*a* has a structure in which a width in the left-right direction of the end cavity becomes wider as moving from upward to downward. The end opening 1223*b* that is positioned at the lower end of the end cavity 1223*a* has a rectangular shape extending in the left-right direction in the plan view seen from the up-down direction.

When the second member 12 is installed to the first member 11, the projection 1123 of the first member 11 is inserted into the opening 1211 of the second member 12. As a result, the internal space 1123*a* of the projection 1123 is connected to the slope cavity 1221*a*. That is, the first fluid passage 11*b* is connected to the slope cavity 1221*a*. The fluid that has flown from the first fluid passage 11*b* into the slope cavity 1221*a* passes though the slope cavity 1221*a*, the curved cavity 1222*a*, the end cavity 1223*a*, and the end opening 1223*b*, in this order, and is sprayed to an outside of the second member 12.

That is, the second member 12 has the second fluid passage 12*a* to be connected to the first fluid passage 11*b* and a spray port 12*b* from which the fluid that has passed through the second fluid passage 12*a* is sprayed onto the predetermined location of the sensor. In this embodiment, the slope cavity 1221*a*, the curved cavity 1222*a*, and the end cavity 1223*a* constitute the second fluid passage 12*a* as a passage of air. The end opening 1223*b* constitutes the spray port 12*b* from which the air is sprayed onto the lens 4*a* of the camera 4. In this embodiment, the air is sprayed downward from the spray port 12*b*.

Generally, it is desirable that the fluid spray nozzle spray the fluid from a position possibly close to a location (the lens 4*a* in this example) from which a foreign matter is removed. Thus, the fluid spray nozzle has a shape conforming to a shape of at least one of the sensor (the camera 4 in this example) and the mounted portion (the camera bracket 5 in this example) to which the sensor is mounted. By the way, the shapes of the sensor and the mounted portion are easy to be changed due to restriction of the places (vehicle, etc.) in which the sensor and the mounted portion are disposed. Thus, it is necessary to change the shape of the fluid spray nozzle according to changes in shapes of the sensor, and the like. As a result, in the conventional technology, whenever the shapes of the sensor, and the like, are changed, it is necessary to remake a mold that is used for manufacturing the fluid spray nozzle, and thus, a manufacturing cost of the fluid spray nozzle tends to increase.

In this point, in the fluid spray nozzle 1 according to this embodiment, the first member 11 and the second member 12 are separately prepared and both members 11, 12 are connected to each other to form the fluid spray nozzle 1. Thus, one of the both members 11, 12 is used as a shape change required component whose shape is changed according to the changes in shapes of the sensor, and the like, and the other is used as a versatile component that is commonly used even when shapes of the sensor, and the like, are changed. In such a configuration, a component that can be formed while reducing a manufacturing cost of the mold is used as the shape change required component, and a component that increases the manufacturing cost of the mold is used as the versatile component. As a result, it is possible to reduce the manufacturing cost of the fluid spray nozzle while improving versatility, compared to a configuration (conventional configuration) in which the entire mold for manufacturing the fluid spray nozzle is remade according to the changes in shapes of the sensor, and the like. Furthermore, in the fluid spray nozzle 1 according to this embodiment, it is possible to reduce a number of components by the configuration in which the first member 11 and the second member 12 are fixed to each other, compared to when the first member 11 and the second member 12 are configured to be removable, and it is possible to reduce the manufacturing cost.

In the fluid spray nozzle 1 according to this embodiment, the first member 11 corresponds to the shape change required component, and the second member 12 corresponds to the versatile component. A shape of the first member 11 is changed, for example, according to at least one change in a mounting position of the fluid spray nozzle 1, a shape of the camera 4, and a shape of the camera bracket 5. The first member 11 is easily integrally molded by the mold, and the manufacturing cost is relatively low.

As described above, the second fluid passage 12a of the second member 12 has a curved structure. A first cross-sectional shape as a cross-sectional shape of a part of the second fluid passage 12a that is connected to the first fluid passage 11b is different from a second cross-sectional shape as a cross-sectional shape of the spray port 12b. Generally, the fluid spray nozzle in which a passage having a curved structure and different cross-sectional shapes is provided is hardly integrally molded, and the manufacturing cost tends to increase. For example, the fluid spray nozzle is formed by joining a plurality of components (resin molded products) using ultrasonic wave welding, etc., so that costs required for equipment and jigs tend to increase.

In this point, in this embodiment, the fluid spray nozzle 1 is divided into the first member 11 and the second member 12, a part having a shape (the curved structure, etc.) associated with higher manufacturing cost is provided in the second member 12. Thus, even when the shape of the fluid spray nozzle should be changed to cope with the changes in shapes of the sensor, and the like by using the second member 12 as the versatile component, it is possible to cope with the changes in shapes of the sensor, and the like by the first member 11 that relatively reduces the manufacturing cost. That is, according to the configuration of this embodiment, it is possible to reduce the manufacturing cost and to improve versatility for the fluid spray nozzle whose shape should be changed to cope with the changes in shapes of the sensor, and the like.

The second member 12 according to this embodiment is formed, for example, by joining a plurality of members, such as two members, formed by resin molding. In order to join the plurality of the members, for example, it is possible to use ultrasonic wave welding, adhesion by adhesive, and the like. In this embodiment, although the second fluid passage 12a has a curved structure and different cross-sectional shapes, the second fluid passage 12a may have only one of the curved structure and the different cross-sectional shapes.

Specifically, the first cross-sectional shape as the cross-sectional shape of the part of the second fluid passage 12a that is connected to the first fluid passage 11b is a circular shape. Furthermore, the second cross-sectional shape as the cross-sectional shape of the spray port 12b is a rectangular shape. In such a configuration, it is possible to spray the fluid suitable for removing water droplets, etc. in the predetermined location of the sensor, such as the lens 4a of the camera 4. For example, it is possible to strongly spray the fluid while widening a spray range by widening a width in a specific direction. The first cross-sectional shape and the second cross-sectional shape are merely examples, and these shapes may be appropriately changed.

In this embodiment, the second member 12 has the opening 1211 into which the projection 1123 of the first member 11 is inserted. However, contrary to this configuration, the second member 12 may have a projection, and the first member 11 may have an opening into which the projection of the second member 12 is inserted. That is, the second member 12 may have the opening into which the projection of the first member 11 is inserted or the projection that is inserted into the opening of the first member 11. An engagement position between the projection 1123 and the opening 1211 may constitute a connection portion 13 that connects the first fluid passage 11b and the second fluid passage 12a. As described above, since a configuration using an engagement between the projection 1123 and the opening 1211 is adopted between the first member 11 and the second member 12, it is possible to easily use the second member 12 as the versatile component.

As illustrated in FIG. 1 and FIG. 2, the fluid spray nozzle 1 further includes member-to-member fastening screws 14 that fasten the first member 11 and the second member 12. In this embodiment, a number of the member-to-member fastening screws 14 is two. However, the number may be appropriately changed. The second member 12 has a pair of second member screw insertion holes 1212 through which a pair of member-to-member fastening screws 14 are passed in a surface in which the opening 1211 or the projection is provided. In this embodiment, the pair of second member screw insertion holes 1212 are provided in the surface in which the opening 1211 of the coupling portion 121 is provided. The pair of second member screw insertion holes 1212 penetrate in the front-rear direction. The pair of second member screw insertion holes 1212 are disposed symmetrically in the left-right direction with the opening 1211 as a reference.

In the front surface of the rectangular parallelepiped portion 1121 of the first member 11, a pair of screw holes 1121c through which parts of the pair of member-to-member fastening screws 14 that have been passed through the pair of second member screw insertion holes 1212 are inserted are provided. The second member 12 is fixed to the first member 11 by screwing using the pair of screw holes 1121c and the pair of member-to-member fastening screws 14.

The pair of screw holes 1121c may penetrate or may not penetrate through the rectangular parallelepiped portion 1121 in the front-rear direction. The pair of screw holes 1121c are disposed symmetrically in the left-right direction with the projection 1123 as a reference. When the pair of member-to-member fastening screws 14 are tapping screws, instead of the pair of screw holes 1121c, holes into which ends of the tapping screws are inserted may be disposed in the front surface of the rectangular parallelepiped portion 1121.

As described in this embodiment, by fastening the first member 11 to the second member 12 using the pair of member-to-member fastening screws 14, the both members 11, 12 are firmly fastened to each other. Furthermore, by providing the pair of second member screw insertion holes 1212 in the surface in which the opening 1211 of the second member 12 (or the projection) is provided, it is possible to easily use the second member 12 as the versatile component. The first member 11 and the second member 12 may be joined, for example, using adhesive, etc. That is, the first member 11 and the second member 12 may be integrated without using the pair of member-to-member fastening screws 14.

In a state in which the first member 11 is fastened to the second member 12 by the pair of member-to-member fastening screws 14, a part of the second member 12 on a rear side thereof is disposed on the camera mounting portion 111 of the first member 11. The pair of projections 1111a to be provided on the mounting flat plate portion 1111 are inserted into a pair of recesses 122a to be provided in a lower surface of the second fluid passage constituting portion 122 of the second member 12. The pair of recesses 122a are recessed toward the front direction. In such a configuration, when the first member 11 is fastened to the second member 12 by the pair of member-to-member fastening screws 14, it is possible to start screwing in a state in which the pair of projections 1111a are inserted into the pair of recesses 122a. Thus, when screwing, it is possible to prevent the second member 12 from rotating with respect to the first member 11. That is, it is possible to effectively perform screwing.

As described above, in this embodiment, the first member 11 is mounted to the camera 4 that is used as the sensor. In such a configuration, in order to appropriately position the spray port 12b of the fluid spray nozzle 1, a position of the first member 11 with respect to the sensor (camera 4) is important. Considering this point, when the first member 11 is adhered to the sensor, it is desirable that the first member 11 have a pressing portion that presses against the mounted portion to which the sensor is mounted in a predetermined direction. Thus, the first member 11 is positioned with respect to the sensor using the mounted portion in the predetermined direction, and the first member 11 can be adhered to the sensor. That is, it is possible to appropriately position the spray port 12b of the fluid spray nozzle 1.

Figure 6:
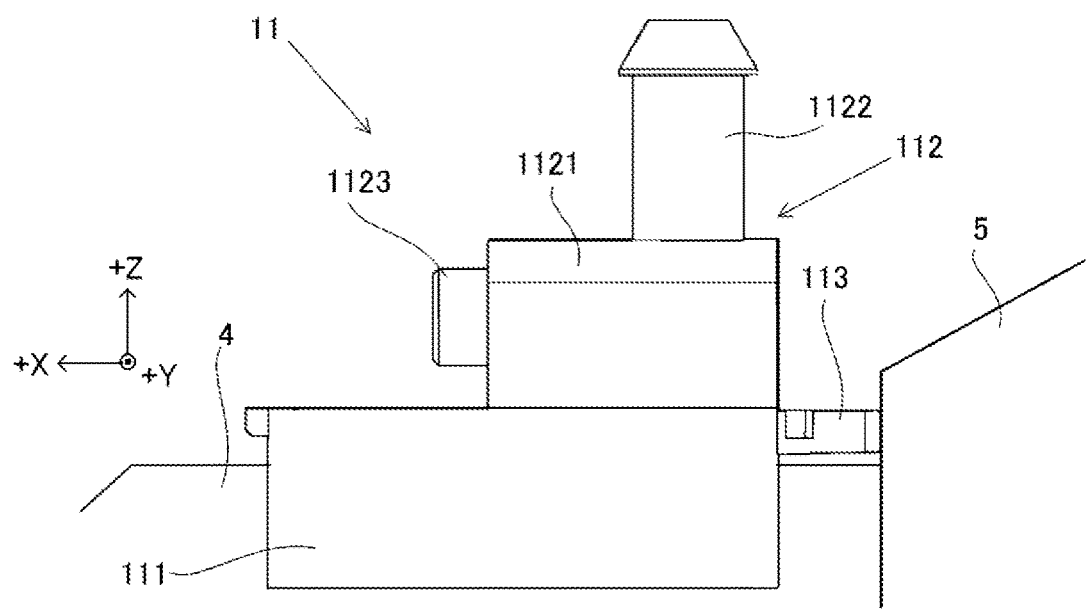
FIG. 6 is a schematic side view of a first member fixed to a camera.

FIG. 6 is a schematic side view of the first member 11 fixed to the camera 4. FIG. 6 is a side view seen from the right side. As illustrated in FIG. 6, in this embodiment, when the first member 11 is adhered to the camera 4, the first member 11 has a pressing portion 113 that presses against the camera bracket 5 in the front-rear direction. The front-rear direction corresponds to an optical axis direction of the camera 4. That is, in this embodiment, the sensor is the camera 4, and the predetermined direction is the optical axis direction. Furthermore, the mounted portion is the camera bracket 5.

In such a configuration, the first member 11 is positioned with respect to the camera 4 using the pressing portion 113 and the camera bracket 5 in the optical axis direction, and the first member 11 can be adhered to the camera 4. Thus, it is possible to appropriately position the spray port 12b with respect to the camera 4, and to appropriately remove the foreign matter adhering to the lens 4a by the fluid spraying from the spray port 12b.

Figure 7A:
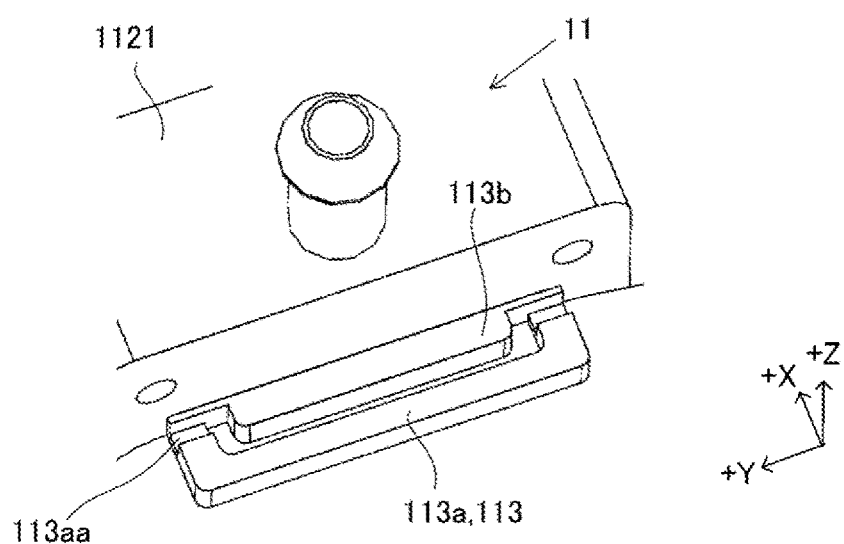
FIG. 7A is a schematic view illustrating a detailed example of a pressing portion.
Figure 7B:
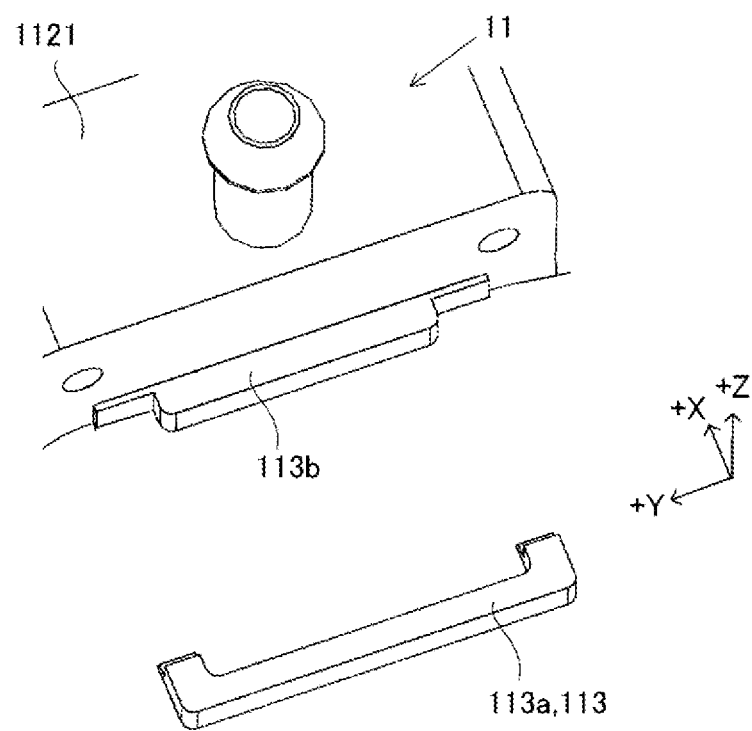
FIG. 7B is a schematic view illustrating the detailed example of the pressing portion.

Each of FIG. 7A and FIG. 7B is a schematic view illustrating a detailed example of the pressing portion 113. As illustrated in FIG. 6 and FIG. 7A, specifically, the pressing portion 113 is a first pressing portion 113a that is cuttably provided. The first member 11 further has a second pressing portion 113b that presses against the mounted portion in the predetermined direction when the first pressing portion 113a is cut off. In this embodiment, the mounted portion is the camera bracket 5. The predetermined direction is the optical axis direction. FIG. 7B illustrates a state in which the first pressing portion 113a is cut off.

In such a configuration, it is possible to select any one of a plurality of the pressing portions 113a, 113b to be used depending on a position of the sensor (camera 4 in this example) at which the first member 11 is desired to be disposed in the predetermined direction. For example, when a length of the optical axis direction of the camera 4 is changed, the position of the camera at which the first member 11 is desired to be disposed in the predetermined direction is changed. In such a case, it is convenient if it is possible to select which pressing portion should be used.

Specifically, the first pressing portion 113a and the second pressing portion 113b project in the predetermined direction from an opposite surface of the first member 11 facing the mounted portion in the predetermined direction. More specifically, the first pressing portion 113a and the second pressing portion 113b project rearward from the opposite surface of the first member 11 facing the camera bracket 5 in the front-rear direction (corresponding to the optical axis direction). The opposite surface of the first member 11 that faces the camera bracket 5 in the front-rear direction is a rear surface of the first member 11. That is, in this embodiment, the first pressing portion 113a and the second pressing portion 113b project rearward from the rear surface of the first member 11.

The first pressing portion 113a has a U-shape in the plan view seen from the up-down direction and surrounds the second pressing portion 113b. The first pressing portion 113a and the second pressing portion 113b may come into contact with each other or may be separated from each other in the front-rear direction. The first pressing portion 113a has a thin portion 113aa thinner than other parts of the first pressing portion 113a. The thin portion 113aa is provided in a position closer to the opposite surface than an end of the second pressing portion 113b in the predetermined direction (the front-rear direction in this example). The thin portion 113aa is thinner than other parts of the first pressing portion 113a in the up-down direction.

As described above, since the first pressing portion 113a is provided with the thin portion 113aa, the first pressing portion 113a is easily cut off at the thin portion 113aa and this allows a person who cuts off the first pressing portion 113a to easily recognize which portion should be cut off. In the predetermined direction (the front-rear direction in this example), since the second pressing portion 113b is more largely projected than the thin portion 113aa, by cutting off the first pressing portion 113a at the thin portion 113aa, it is possible to use the second pressing portion 113b instead of the first pressing portion 113a.

In this embodiment, there are two types of pressing portions that are the first pressing portion 113a and the second pressing portion 113b. However, this is merely an example. There may be one type or three more types of pressing portions that project rearward from the rear surface of the first member 11. Furthermore, the rear surface of the first member 11 may be used as the pressing portion.

2-2. Second Embodiment

Figure 8:
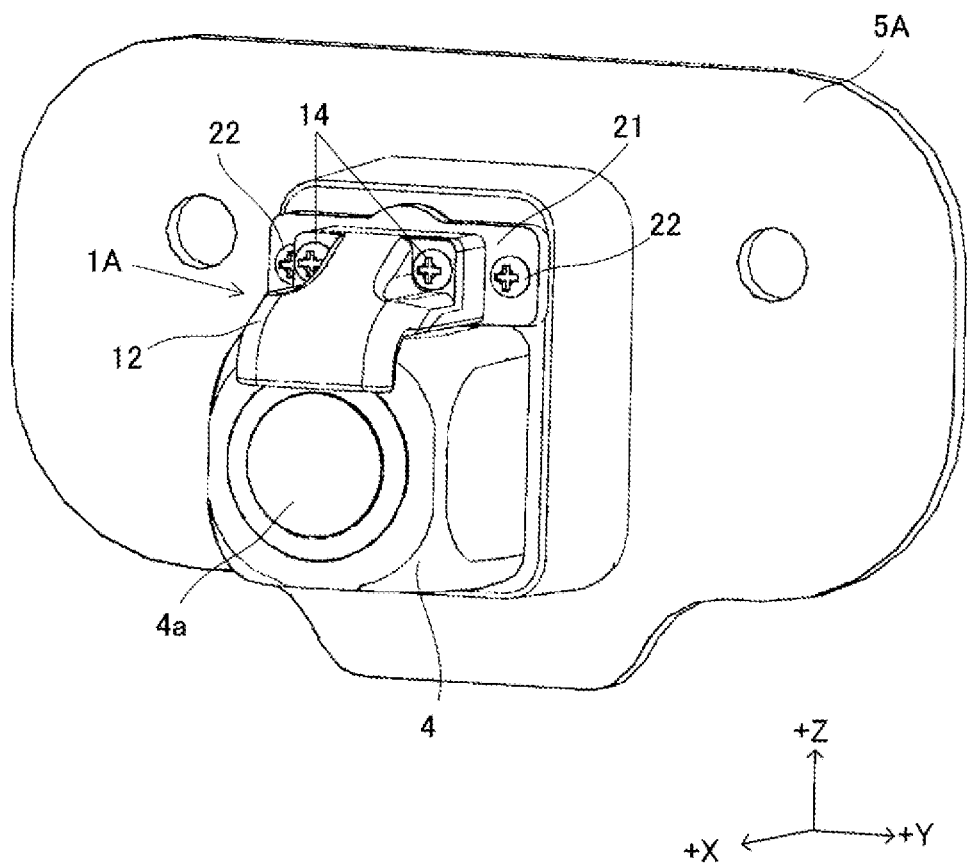
FIG. 8 is a perspective view illustrating a schematic configuration of a fluid spray nozzle according to a second embodiment.

Next, a fluid spray nozzle 1A according to a second embodiment will be described. In order to describe the fluid spray nozzle 1A according to the second embodiment, contents that overlap with the first embodiment will be appropriately omitted. FIG. 8 is a perspective view illustrating a schematic configuration of the fluid spray nozzle 1A according to the second embodiment. In order to facilitate understanding, FIG. 8 illustrates a camera 4 used as a sensor, and a camera bracket 5A used as a mounted portion to which the camera 4 is mounted.

The fluid spray nozzle 1A according to the second embodiment, as in the first embodiment, has a first member 21 and a second member 12. The second member 12 is the versatile component described above. That is, the second member 12 is completely the same as that of the first embodiment. Since the camera bracket 5A has a different configuration from the camera bracket 5 of the first embodiment, the first member 21 is mounted to the camera bracket 5A. Due to this configuration change, the first member 21 of the second embodiment has a different configuration from the first member 11 of the first embodiment that is mounted to the camera 4.

Figure 9:
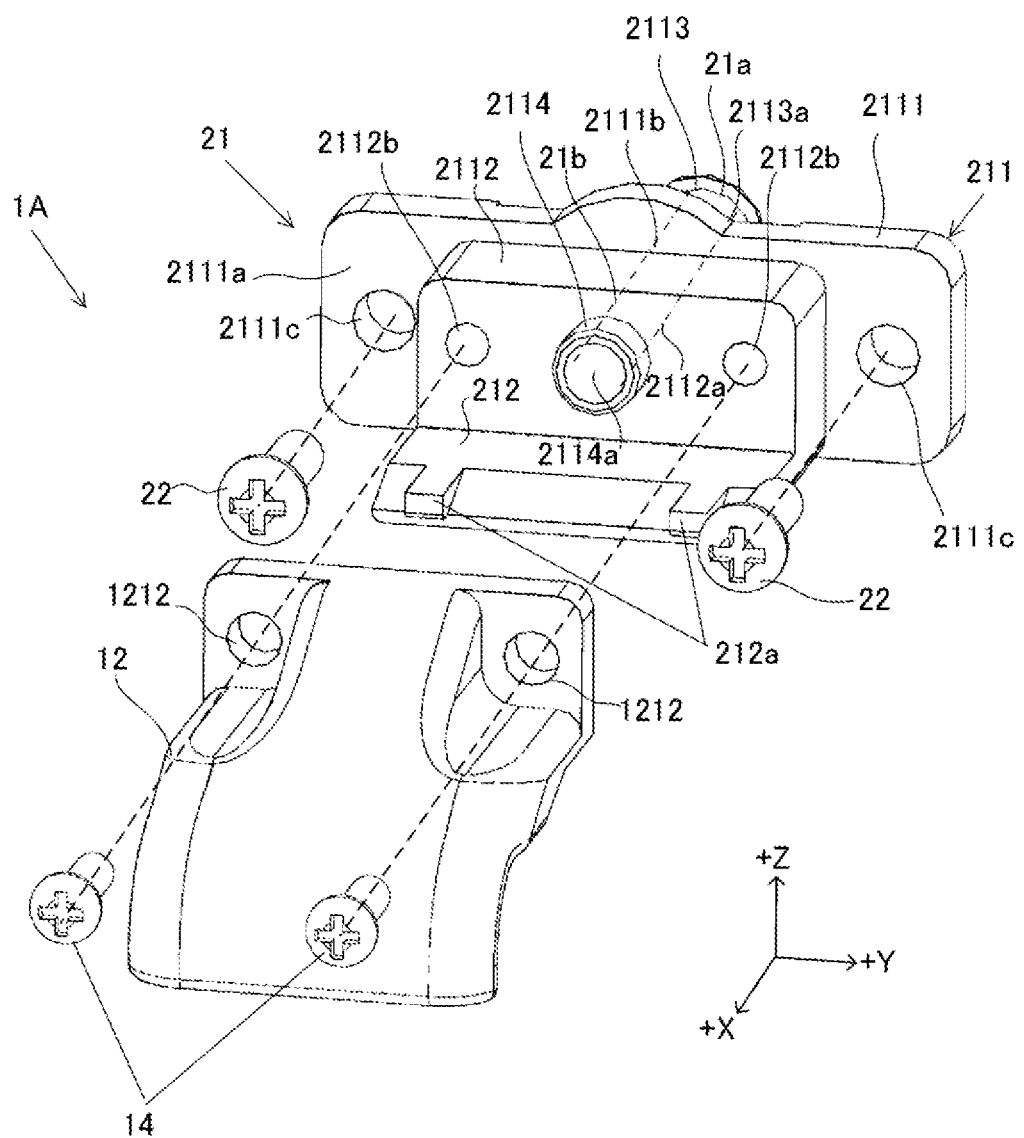
FIG. 9 is an exploded perspective view illustrating the schematic configuration of the fluid spray nozzle according to the second embodiment.

FIG. 9 is an exploded perspective view illustrating the schematic configuration of the fluid spray nozzle 1A according to the second embodiment. As illustrated in FIG. 9, the first member 21 has a first fluid passage constituting portion 211 and a first member projection 212. The first fluid passage constituting portion 211 and the first member projection 212 are made of a single member.

The first fluid passage constituting portion 211 has a first flat plate 2111, a second flat plate 2112, a supply pipe connection portion 2113, and a projection 2114.

The first flat plate 2111 and the second flat plate 2112 extend in a direction parallel to an up-down direction. The first flat plate 2111 and the second flat plate 2112 are arranged fore and aft. The second flat plate 2112 is in front and the first flat plate 2111 is behind. The first flat plate 2111 and the second flat plate 2112 have rectangular shapes in a plan view seen from a front-rear direction, and positions of bisectors respectively bisecting the first flat plate 2111 and the second flat plate 2112 in a left-right direction correspond to each other. The second flat plate 2112 has a width in the left-right direction smaller than that of the first flat plate 2111. Thus, the first flat plate 2111 has front face walls 2111a on right and left sides of the first flat plate 2111 that are exposed without hiding in the second flat plate 2112.

In an interior of the first flat plate 2111, a cavity inside the first flat plate 2111b that extends in the front-rear direction is provided. In an interior of the second flat plate 2112, a cavity inside the second flat plate 2112a that extends in the front-rear direction is provided. The cavity inside the first flat plate 2111b and the cavity inside the second flat plate 2112a have circular cross sections in the plan view seen from the front-rear direction. The cavity inside the first flat plate 2111b and the cavity inside the second flat plate 2112a are connected to each other.

The supply pipe connection portion 2113 projects rearward from a central portion of a rear surface of the first flat plate 2111. The supply pipe connection portion 2113 has a tubular shape, specifically, a cylindrical shape, which extends rearward. The fluid supply pipe 2 described above (refer to FIG. 1) is connected to the supply pipe connection portion 2113. An internal space 2113a of the supply pipe connection portion 2113 is connected to the cavity inside the first flat plate 2111b.

The projection 2114 projects forward from a central portion of a front surface of the second flat plate 2112. The projection 2114 has a tubular shape, specifically, a cylindrical shape, which extends forward. An internal space 2114a of the projection 2114 is connected to the cavity inside the second flat plate 2112a.

A fluid supplied from a pump apparatus 3 (refer to FIG. 1) to the fluid spray nozzle 1A via the fluid supply pipe 2 passes through the internal space 2113a of the supply pipe connection portion 2113, the cavity inside the first flat plate 2111b, the cavity inside the second flat plate 2112a, and the internal space 2114a of the projection 2114, in this order, and exits from the first member 21. That is, the first member 21 has an inlet 21a of the fluid and a first fluid passage 21b that is connected to the inlet 21a. In this embodiment, the inlet 21a is positioned at a rear end of the supply pipe connection portion 2113 and introduces air. The internal space 2113a of the supply pipe connection portion 2113, the cavity inside the first flat plate 2111b, the cavity inside the second flat plate 2112a, and the internal space 2114a of the projection 2114 constitute the first fluid passage 21b as an air passage.

The first member projection 212 projects forward from a lower end of the second flat plate 2112. The first member projection 212 is a plate and has a rectangular shape in the plan view seen from the up-down direction. The first member projection 212 has a pair of projections 212a projecting forward from a front end of the first member 212. The pair of projections 212a are disposed at an interval from each other in the left-right direction. Specifically, in the plan view seen from the up-down direction, the pair of projections 212a are disposed in line symmetry with respect to a bisector bisecting the first member projection 212 in the left-right direction.

As in the first embodiment, the first member 21 is fastened to the second member 12 by a pair of member-to-member fastening screws 14 in a state in which the projection 2114 is inserted into an opening 1211 (refer to FIG. 3). An engagement position between the projection 2114 and the opening 1211 constitute a connection portion that connects the first fluid passage 21b and a second fluid passage 12a (refer to FIG. 4).

The first member 21 is provided with a pair of screw holes 2112b through which parts of the pair of member-to-member fastening screws 14 that have been passed through a pair of second member screw insertion holes 1212 are inserted. Specifically, the pair of screw holes 2112b are provided in the front surface of the second flat plate 2112. The pair of screw holes 2112b are disposed symmetrically in the left-right direction with the projection 2114 as a reference. When the pair of member-to-member fastening screws 14 are tapping screws, instead of the pair of screw holes 2112b, holes into which ends of the tapping screws are inserted may be disposed.

In this embodiment, as in the first embodiment, in a state in which the first member 21 is fastened to the second member 12 by the pair of member-to-member fastening screws 14, the pair of projections 212a are inserted into a pair of recesses 122a (refer to FIG. 3) to be provided in the second member 12. Thus, when fastening the first member 21 and the second member 12 by the pair of member-to-member fastening screws 14, it is possible to prevent the second member 12 from rotating with respect to the first member 21.

The first member 21 is fastened to the camera bracket 5A (mounted portion) by a pair of external fastening screws 22. Thus, the first member 21 has a pair of first member screw insertion holes 2111c through which the pair of external fastening screws 22 are passed. When the first member 21 is mounted to the mounted portion such as the camera bracket 5A, the configuration according to this embodiment is convenient. Specifically, the pair of first member screw insertion holes 2111c are provided in the first member 21. The pair of first member screw insertion holes 2111c are disposed symmetrically in the left-right direction with the projection 2114 as a reference.

The camera bracket 5A is provided with a pair of screw holes (not shown) through which parts of the pair of external fastening screws 22 that have been passed through the pair of first member screw insertion holes 2111c are inserted. The first member 21 is fixed to the camera bracket 5A by screwing using the pair of screw holes and the pair of external fastening screws 22. When the pair of external fastening screws 22 are tapping screws, the pair of screw holes that are provided in the camera bracket 5A may be holes into which ends of the tapping screws are inserted, instead of the pair of screw holes.

In this embodiment, the camera bracket 5A is provided with an opening so that the supply pipe connection portion 2113 is projected to a rear side of the camera bracket 5A when the first member 21 is mounted to the camera bracket 5A. In such a configuration, the fluid supply pipe 2 is disposed on the rear side of the camera bracket 5A to hide the fluid supply pipe 2. That is, it is possible to improve an appearance of a fluid spray system 100.

2-3. Modification

Figure 10:
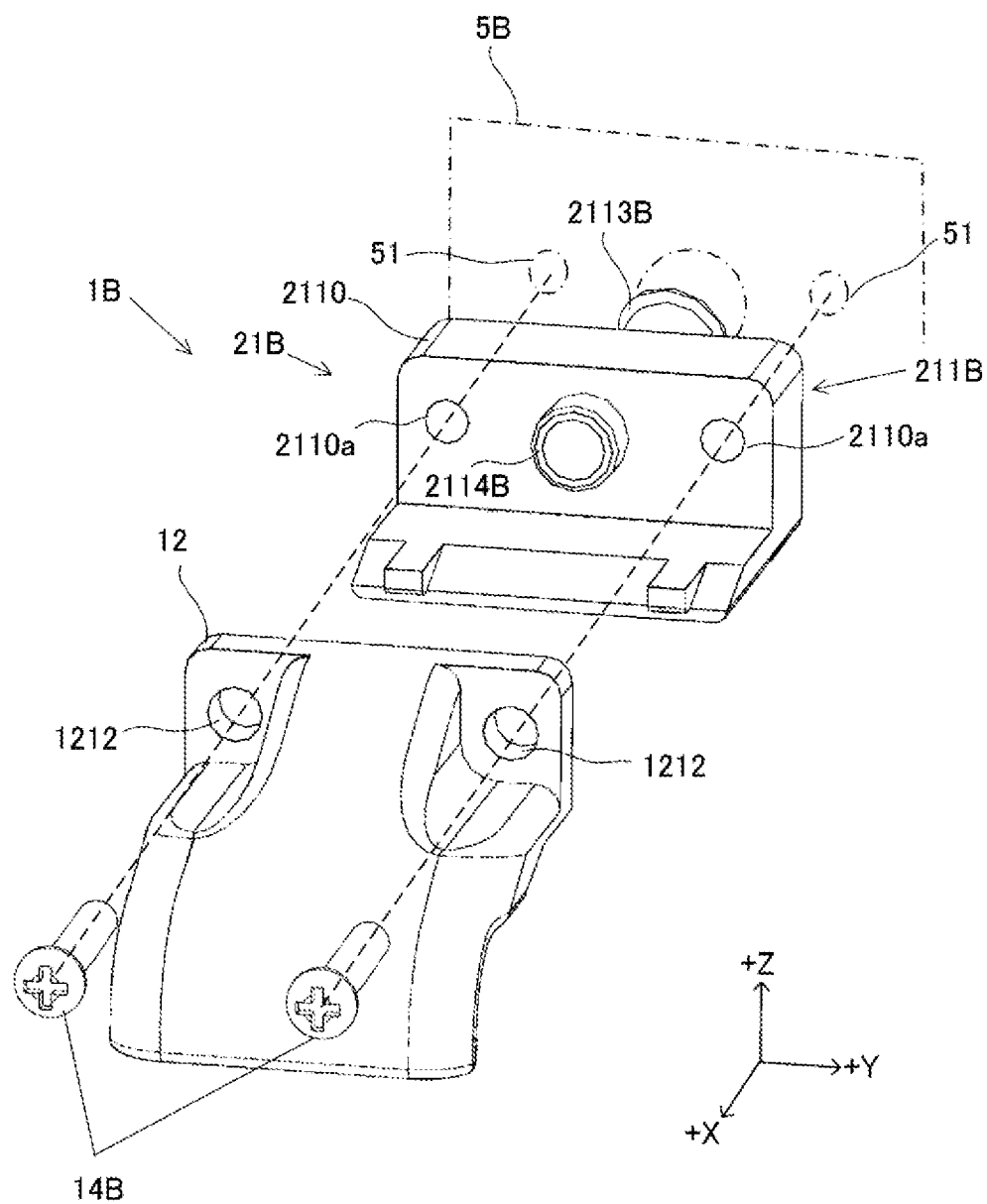
FIG. 10 is an exploded perspective view illustrating a schematic configuration of a fluid spray nozzle according to a modification of the second embodiment.

FIG. 10 is an exploded perspective view illustrating a schematic configuration of a fluid spray nozzle 1B according to a modification of the second embodiment. In order to facilitate understanding, a part of a camera bracket 5B as a mounted portion is shown by an alternate long and short dash line in FIG. 10. In this modification, a second member 12 is the versatile component described above and is completely the same as that of the first embodiment.

In the fluid spray nozzle 1B of the modification, in the same way as the fluid spray nozzle 1A of the second embodiment, a first member 21B has a first fluid passage constituting portion 211B. However, in this modification, a part constituted by the first flat plate 2111 and the second flat plate 2112 in the second embodiment is constituted by a single flat plate 2110. This point is different from the second embodiment. A supply pipe connection portion 2113B to be connected to a fluid supply pipe 2 (refer to FIG. 1) projects rearward from a rear surface of the flat plate 2110. Furthermore, a projection 2114B to be inserted into an opening 1211 (refer to FIG. 3) of the second member 12 projects forward from a front surface of the flat plate 2110.

In this modification, the first member 21B has a pair of first member screw insertion holes 2110a to be coaxially disposed with a pair of second member screw insertion holes 1212. The pair of first member screw insertion holes 2110a penetrate through the flat plate 2110 in a front-rear direction. A pair of member-to-member fastening screws 14B that fasten the first member 21B to the second member 12 also fasten the first member 21B to the camera bracket 5B (mounted portion).

Specifically, the pair of member-to-member fastening screws 14B are inserted from a front side of the second member 12 into the pair of second member screw insertion holes 1212 and the pair of first member screw insertion holes 2110a, in this order. Ends of the pair of member-to-member fastening screws 14B are fitted into screw holes 51 provided in the camera bracket 5B that is disposed behind the first member 21B. The first member 21B is fastened to the second member 12 and the camera bracket 5B by the pair of member-to-member fastening screws 14B.

According to a configuration of this modification, since the pair of member-to-member fastening screws 14B that fasten the first member 21B to the second member 12 also fasten the first member 21B to the camera bracket 5B (mounted portion), it is possible to reduce a number of components and work man-hour.

3. Points of Attention

In addition to the foregoing embodiments, various technological features disclosed in this specification can be changed without departing from the spirit of the technical invention. In other words, the foregoing embodiments are examples in every aspect, and do not intend to limit the invention. The scope of the invention will be defined by the scope of claims, not by the description in the foregoing embodiments. The scope of the claims should include the scope of claims, equivalents thereof and all changes within the scope. Furthermore, features of the above-described preferred embodiments and the modifications thereof may be combined appropriately as long as no conflict arises.

While the invention has been shown and described in detail, the foregoing description is in all aspects illustrative and not restrictive. It is therefore understood that numerous other modifications and variations can be devised without departing from the scope of the invention.

What is claimed is:

1. A fluid spray nozzle comprising:
a first member that is configured to be fixed to a sensor, the first member having (i) a front surface, (ii) an opposing surface that is configured to face in a predetermined direction toward a mounted portion to which the sensor is mounted when the first member is fixed to the sensor, the opposing surface configured to be opposing the mounted portion when the first member is fixed to the sensor, (iii) a fluid inlet and (iv) a first fluid passage that is connected to the fluid inlet; and
a second member that is fixed to the front surface of the first member, the second member having a second fluid passage that is connected to the first fluid passage, and a spray port from which the fluid
that has passed through the second fluid passage is configured to be sprayed onto a predetermined location of the sensor, wherein
the first member has an attachment surface configured to be attached to an outer surface of the sensor,
the first member has a first pressing portion that projects from the opposing surface of the first member in the predetermined direction and extends toward the mounted portion to press against the mounted portion when the attachment surface of the first member is attached to the sensor, and
the first pressing portion has a thin portion that is thinner than other parts of the first pressing portion, the thin portion enabling the first pressing portion to be removed from the first member to change a distance between the opposing surface of the first member and the mounted portion when the attachment surface of the first member is attached to the sensor.

2. The fluid spray nozzle according to claim 1, wherein the second fluid passage is curved.

3. The fluid spray nozzle according to claim 1, wherein a first cross-sectional shape of a part of the second fluid passage that is connected to the first fluid passage is different from a second cross-sectional shape of the spray port.

4. The fluid spray nozzle according to claim 3, wherein the first cross-sectional shape is a circular shape, and the second cross-sectional shape is a rectangular shape.

5. The fluid spray nozzle according to claim 1, wherein one of the first and second members has an opening into which a projection of the other of the first and second members is inserted, and an engagement position between the projection and the opening constitutes a connection portion that interconnects the first fluid passage and the second fluid passage.

6. The fluid spray nozzle according to claim 5, further comprising:

a pair of member-to-member fastening screws that fasten the first member to the second member, wherein the second member has a pair of second member screw insertion holes through which the pair of member-to-member fastening screws are passed, the pair of second member screw insertion holes being provided in a surface of the second member in which the opening or the projection is provided.

7. The fluid spray nozzle according to claim 1, wherein the attachment surface is a sticking surface configured to be adhered to the outer surface of the sensor.

8. The fluid spray nozzle according to claim 1, wherein the first member further has a second pressing portion that projects from the opposing surface of the first member in the predetermined direction and extends toward the mounted portion to press against the mounted portion when the first pressing portion has been removed from the first member.

9. The fluid spray nozzle according to claim 8, wherein the thin portion is provided in the first pressing portion at a position closer to the opposing surface of the first member than an end of the second pressing portion in the predetermined direction.

10. The fluid spray nozzle according to claim 1, wherein the sensor is a camera, and the predetermined direction is an optical axis direction of the camera.

11. The fluid spray nozzle according to claim 6, wherein the first member has a pair of first member screw insertion holes to be coaxially disposed with the pair of second member screw insertion holes, and the pair of member-to-member fastening screws extend into the first member screw insertion holes.

12. An assembly comprising:

the fluid spray nozzle according to claim 1; and the sensor to which the fluid spray nozzle is fixed.

13. The assembly according to claim 12, wherein the sensor is a camera, and the predetermined location of the sensor is a lens of the camera.

* * * * *